(12) United States Patent
Ubukata et al.

(10) Patent No.: US 9,289,860 B2
(45) Date of Patent: Mar. 22, 2016

(54) JIG USED FOR REPAIRING PIN-COUPLING COMPONENT AND METHOD USING THE SAME

(71) Applicant: IHI Corporation, Tokyo (JP)

(72) Inventors: Ken Ubukata, Tokyo (JP); Kazuo Kawai, Tokyo (JP); Mitsuaki Mukai, Tokyo (JP); Masayuki Tomioka, Tokyo (JP)

(73) Assignee: IHI Corporation, Tokyo (JP)

( * ) Notice: Subject to any disclaimer, the term of this patent is extended or adjusted under 35 U.S.C. 154(b) by 69 days.

(21) Appl. No.: 14/061,293

(22) Filed: Oct. 23, 2013

(65) Prior Publication Data

US 2014/0041181 A1  Feb. 13, 2014

Related U.S. Application Data

(63) Continuation of application No. PCT/JP2012/060419, filed on Apr. 18, 2012.

(30) Foreign Application Priority Data

May 31, 2011  (JP) .................. 2011-121936

(51) Int. Cl.
  *B23P 6/00* (2006.01)
  *B23Q 3/06* (2006.01)
  (Continued)

(52) U.S. Cl.
  CPC . *B23P 6/00* (2013.01); *B23B 47/28* (2013.01); *B23Q 3/063* (2013.01); *F01D 25/285* (2013.01);
  (Continued)

(58) Field of Classification Search
  CPC ....... B23P 6/00; F04D 29/324; F04D 29/644; B23Q 3/063; Y10T 29/53983; Y10T 29/49718; B23B 47/28; B23B 2247/12; B23B 2247/08; F01D 25/285; F01D 5/005; F01D 5/3053
  USPC ............... 29/402.01, 402.04, 402.03, 402.09, 29/898, 898.01, 281.6; 269/71, 43
  See application file for complete search history.

(56) References Cited

U.S. PATENT DOCUMENTS 3,601,396 A * 8/1971 Rovin ......................... 271/213
4,953,777 A   9/1990 Griffith et al.
(Continued)

FOREIGN PATENT DOCUMENTS

CN  102000853 A * 4/2011 ............. B23B 47/00
GB  2 138 891 A   10/1984
(Continued)

OTHER PUBLICATIONS

JP 20050279785; Machining Method of Inner Peripheral Surface of Sludge Hole of Carriage for Hard Disk, Backup Tool and Clamp Tool for Use in It, and Machining Device of Inner Peripheral Surface of Sludge Hole of Carriage for Hard Disk; English Translation, apges 1-8.*

(Continued)

*Primary Examiner* — Daivd Bryant
*Assistant Examiner* — Bayan Salone
(74) *Attorney, Agent, or Firm* — Oblon, McClelland, Maier & Neustadt, L.L.P.

(57) ABSTRACT

A jig used for repairing a component having a tang with a hole is comprised of: a main body defining a standard line; a positioning pin detachably attached to the main body and so dimensioned as to fit in the hole to make an axial center of the hole be aligned with the standard line; and a clamp so structured as to catch hold of the tang to secure the component to the main body in a state where the axial center is aligned with the standard line.

7 Claims, 10 Drawing Sheets

(51) Int. Cl.
  *F04D 29/32* (2006.01)
  *F01D 25/28* (2006.01)
  *F01D 5/00* (2006.01)
  *F01D 5/30* (2006.01)
  *B23B 47/28* (2006.01)
  *F04D 29/64* (2006.01)

(52) U.S. Cl.
  CPC ............ *F04D 29/324* (2013.01); *F04D 29/644* (2013.01); *B23B 2247/08* (2013.01); *B23B 2247/12* (2013.01); *F01D 5/005* (2013.01); *F01D 5/3053* (2013.01); *Y10T 29/49718* (2015.01); *Y10T 29/53983* (2015.01)

(56) References Cited

U.S. PATENT DOCUMENTS

| | | | |
|---|---|---|---|
| 6,370,752 B1 * | 4/2002 | Anderson et al. | 29/402.11 |
| 2007/0270931 A1 * | 11/2007 | Leanna et al. | 623/1.11 |
| 2011/0060404 A1 * | 3/2011 | Malewicz et al. | 623/2.11 |

FOREIGN PATENT DOCUMENTS

| | | | | | |
|---|---|---|---|---|---|
| GB | 2138891 | A * | 10/1984 | ................ | F01D 5/30 |
| JP | 60-31904 | | 3/1985 | | |
| JP | S60-31904 | * | 3/1985 | ............. | B23B 41/00 |
| JP | 60-222503 | A | 11/1985 | | |
| JP | 60222503 | A * | 11/1985 | ................ | F01D 5/30 |
| JP | 62201609 | A * | 9/1987 | ............. | B01D 13/00 |
| JP | 62-201609 | | 12/1987 | | |
| JP | 1-155108 | | 10/1989 | | |
| JP | H01-155108 | * | 10/1989 | ............. | B23B 41/12 |
| JP | 11-351195 | | 12/1999 | | |
| JP | 11351195 | A * | 12/1999 | ............. | F04D 29/34 |
| JP | 2000-320492 | | 11/2000 | | |
| JP | 2000320492 | A * | 11/2000 | ............. | F04D 29/34 |
| JP | 2002-045933 | * | 2/2002 | ............. | B21D 39/00 |
| JP | 2002-45933 | A | 2/2002 | | |
| JP | 2002045933 | A * | 2/2002 | ............. | B21D 39/00 |
| JP | 2005-279785 | A | 10/2005 | | |
| JP | 2005279785 | A * | 10/2005 | ............. | B23D 79/04 |
| JP | 2006-43808 | A | 2/2006 | | |
| JP | 2006043808 | A * | 2/2006 | | |
| JP | 2006-247756 | A | 9/2006 | | |
| JP | 2006247756 | A * | 9/2006 | | |
| WO | WO 2012165074 | A1 * | 12/2012 | ............. | F04D 29/34 |

OTHER PUBLICATIONS

JP S60-31904; Device for Attaching Work-Piece for Machine Tools; English Astract; p. 1.*
International Search Report issued on Jun. 19, 2012 for PCT/JP2012/060419 filed on Apr. 18, 2012 with English Translation.
International Written Opinion issued on Jun. 19, 2012 for PCT/JP2012/060419 filed on Apr. 18, 2012.
Japanese Office Action issued Sep. 2, 2014 in Patent Application No. 2013-517923 (with English Translation).
Extended European Search Report issued Jan. 29, 2015 in Patent Application No. 12792589.9.
Office Action issued Jul. 3, 2015, in Chinese Application No. 2012800259814 (with English-language Translation).

* cited by examiner

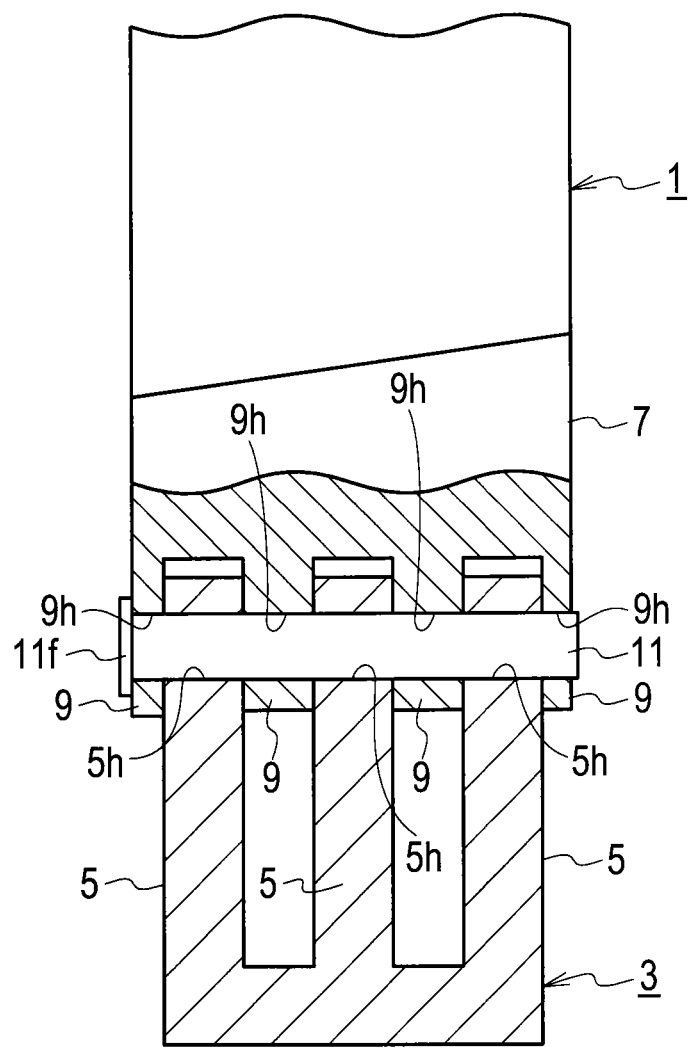

JIG USED FOR REPAIRING PIN-COUPLING COMPONENT AND METHOD USING THE SAME

CROSS-REFERENCE TO RELATED APPLICATIONS

This application is a Continuation Application of PCT International Application No. PCT/JP2012/060419 (filed Apr. 18, 2012), which is in turn based upon and claims the benefit of priority from Japanese Patent Application No. 2011-121936 (filed May 31, 2011), the entire contents of which are incorporated herein by reference.

BACKGROUND OF THE INVENTION

1. Field of the Invention

The present invention relates to a jig for repairing a component to be coupled with a rotary machine such as a gas turbine engine by means of pin-coupling and a method using the same jig.

2. Description of the Related Art

In a rotary machine, coupling between a shaft part and another part sometimes utilizes pin-coupling. In a gas turbine engine for example, while fan blades and a disk rotate together but the former rotates relative to the latter, rotation thereof is accompanied by vibration of peripheries of the pins, thereby causing abrasion on pin holes that receive the pins. As a centrifugal force acts on the pin holes, this abrasion takes the form of an eccentric wear. Excessive eccentric wear requires repair.

In repairing a component, it is important to recover its original shape. If deviation from the original shape is excessive, eccentricity relative to the rotation axis becomes non-negligible. This causes vibration and noise during the operation time, and may further cause shortening of the machine lifetime.

Japanese Patent Applications Laid-open No. H11-351195 and No. 2000-320492 disclose related arts.

SUMMARY OF THE INVENTION

To recover an original shape with precision, it is preferable to base a plane which keeps its original shape and is also reliable in light of precision. Repair of pin holes has problems in this point. The reason is that a pin hole by itself could be a reference plane assuring the best precision but is simultaneously a subject for machining in the repair process. After machining, this standard surface will be lost and subsequent processes must be carried out without any reference. More specifically, in a case where a repair process includes repair of pin holes, the prior art had a problem that it is difficult to recover an original shape with precision. The present invention has been achieved in light of this problem.

According to a first aspect of the present invention, a jig used for repairing a component having a tang with a hole is comprised of: a main body defining a standard line; a positioning pin detachably attached to the main body and so dimensioned as to fit in the hole to make an axial center of the hole be aligned with the standard line; and a clamp so structured as to catch hold of the tang to secure the component to the main body in a state where the axial center is aligned with the standard line.

According to a second aspect of the present invention, a method of using a jig for repairing a component having a tang with a hole is comprised of: detachably attaching a positioning pin to the main body and fitting the pin in the hole to make an axial center of the hole be aligned with a standard line of the main body; and catching hold of the tang with a clamp to secure the component to the main body in a state where the axial center is aligned with the standard line.

BRIEF DESCRIPTION OF DRAWINGS

FIG. 6A shows eccentric wear of a pin hole, FIG. 6B shows machined hole, FIG. 6C shows a tang with a bush pressed therein, and FIG. 6D shows a repaired tang.

FIG. 7 is a partial cross sectional view showing a state where the component and a rotary body establish pin-coupling.

DETAILED DESCRIPTION OF THE EXEMPLARY EMBODIMENTS

Figure 1:
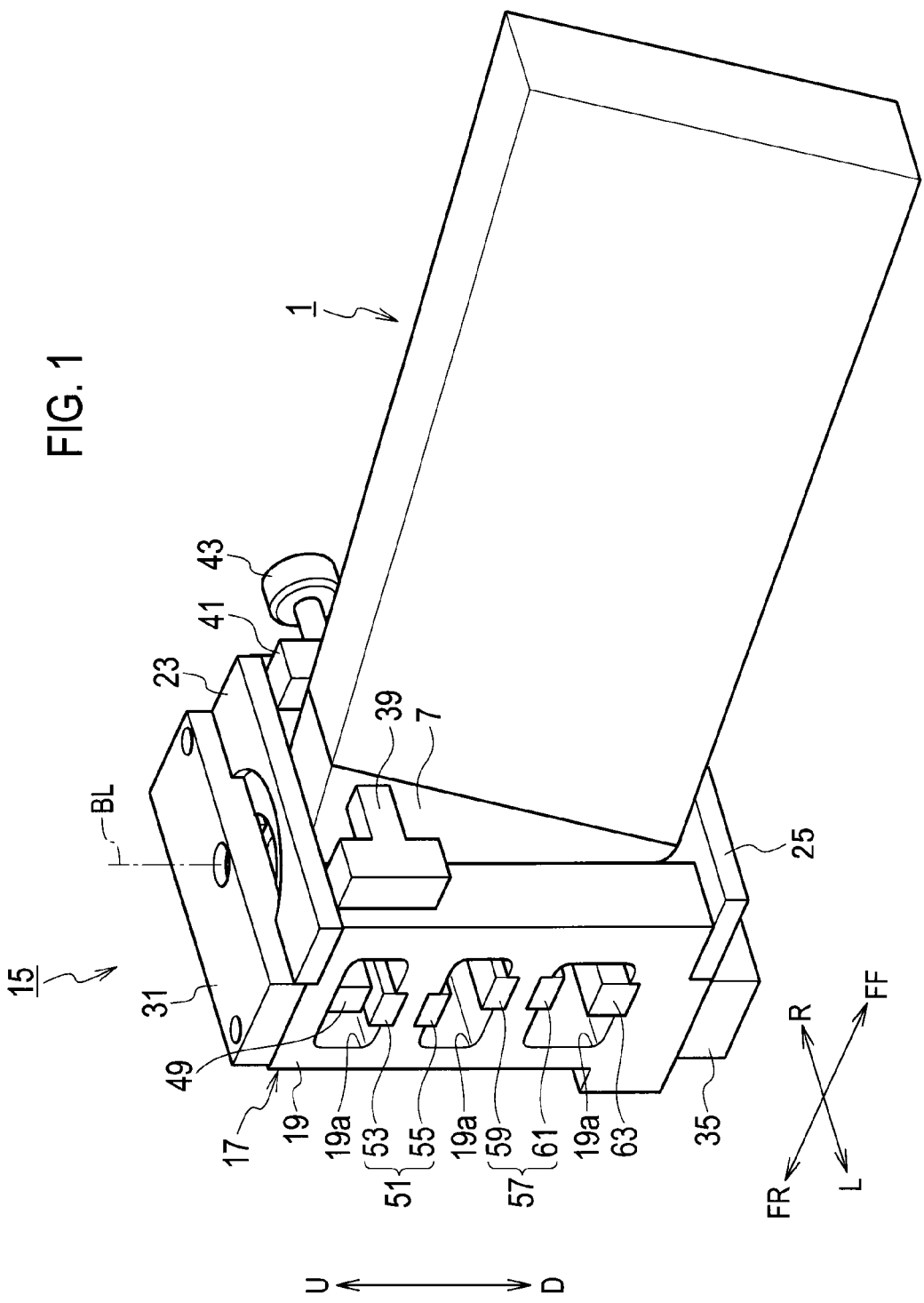
FIG. 1 is a perspective view showing a jig according to an embodiment of the present invention along with a component subject for repair, which is secured to the jig.

Exemplary embodiments of the present invention will be described hereinafter with reference to the appended drawings.

In the appended drawings, reference signs FF, FR, L, R, U and D respectively indicate forward, rearward, leftward, rightward, upward and downward directions only for convenience of explanation, whereas these distinctions are not limiting to the present invention. In addition, the following description exemplifies a case of repairing a fan blade pin-coupled with disk of a gas turbine engine, but this example is not limiting to the present invention.

Referring to FIG. 7, in a gas turbine engine, a shank 7 of a fan blade 1 is comprised of a plurality of tangs 9 and a disk 3 is comprised of a plurality of rims 5 corresponding thereto. A pin 11 penetrating pin holes 9h provided in the tangs 9 and rim holes 5h provided in the rims 5 establishes pin-coupling between them. The pin 11 is usually comprised of a flange 11f for preventing displacement.

Figure 6A:
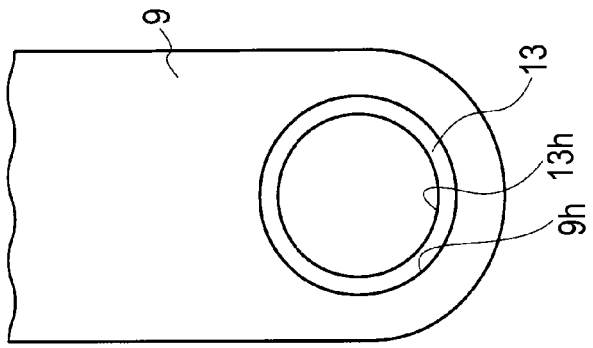
FIGS. 6A-6D are plan views of one of the tangs, where
Figure 6B:
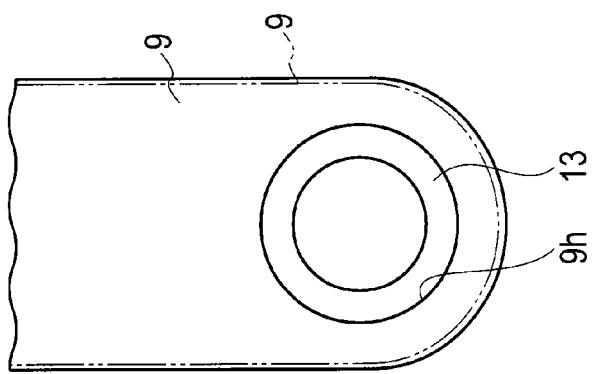
Figure 6C:
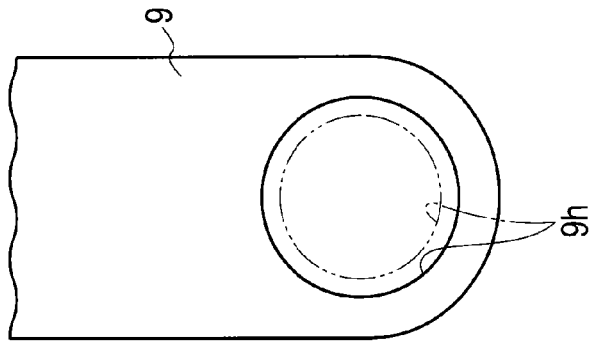
Figure 6D:
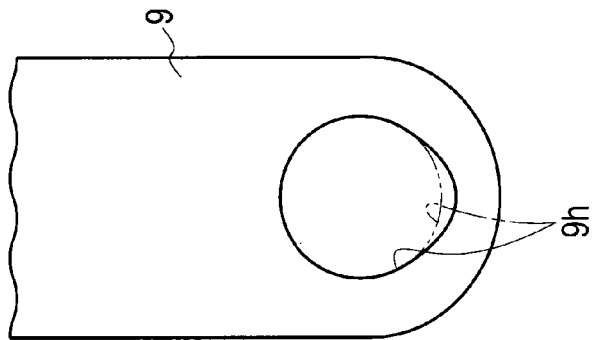

The fan blade 1 receives driving force from the disk 3 to unitarily rotate along therewith. As the fan blade 1 with the disk 3 rotates, vibration occurs in peripheries of the pin-coupling therebetween. This vibration leads to mutual friction between the pin 11 and the pin holes 9h, thereby causing wear on pin holes 9h. As a centrifugal force acts on the pin holes 9h, specific portions thereof are, as shown in FIG. 6A, suffered with wear but the other portions in general keep their original shapes. These portions keeping the original shapes can be used as reference planes for repairing. If the reference planes are used to secure a jig with a member (the fan blade 1) so as to accurately define its position, next the secured jig can be used as a reference. Even if the pin holes 9h were machined and thus the reference planes were lost as shown in FIG. 6B, the secured jig could be used as a reference to carry out subsequent steps, such as a step of pressing a bush 13 into a machined hole as shown in FIG. 6C or a step of machining an internal periphery of the bush 13 to form a renewed pin hole 13h as shown in FIG. 6D for example, with accuracy.

Figure 2:
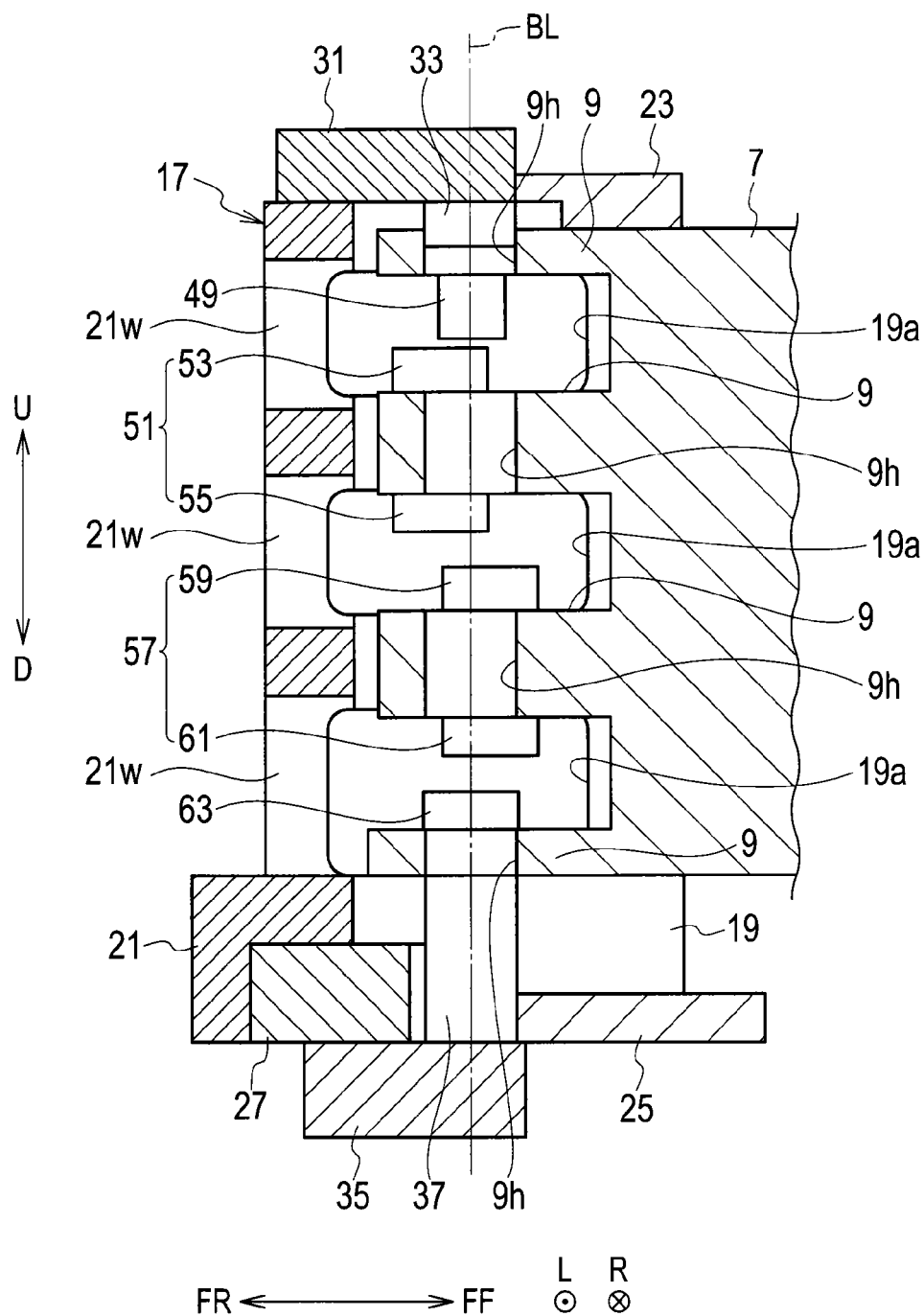
FIG. 2 is a cross sectional view of the jig and the component, mainly showing a relation among the jig, clamps and tangs.

Referring to FIGS. 1 and 2, a jig 15 is used to repair the member 1 comprised of the tangs 9 having the pin holes 9h receiving the coupling pin 11. The jig 15 is comprised of a main body 17 defining a reference line BL, positioning pins 33, 37 fitting in the pin holes 9h, and clamps 45, 51, 57 so structured as to pinch the tangs 9.

The main body 17 has an outline of a rectangular parallelepiped shape shown in the drawings for example, is composed of a back wall 21 and a pair of side wall 19 at both sides thereof, and is opened in the forward direction FF. An upper face and a lower face of the main body 17 are also opened, and the pin holes 9h are accessible through these openings in the axial direction relative to the reference line BL when the member 1 is secured to the main body 17.

It may be preferable in light of stability of accuracy and its shape that the back wall 21 and the side walls 19 are formed in a unitary body, whereas alternatively a disintegrable structure is applicable thereto. The opening in the forward direction FF is so dimensioned, depending on the dimensions of the tangs 9 of the member 1, as to receive the tangs 9. The side walls 19 may be mutually connected by connection plates 23, 25.

Each side wall 19 is comprised of one or more openings 19a to allow access to the pin holes 9h of the tangs 9. In between the openings 19a, the side wall 19 extends horizontally inward relative to the main body 17 and forms ribs. These ribs, along with the tangs 9, are pinched between the clamps 51, 57, thereby the member 1 is secured to the main body 17.

Among the four tangs 9 in the example shown in the drawings, only three tangs aside from the lowermost tang are pinched but the lowermost tang may be pinched as well. Or alternatively, as shown in the drawings, a fitting 63 may be butted against only one side of the lowermost tang. The numbers of the openings and the ribs may be properly determined depending on the number of tangs that the member 1 has.

Figure 5:
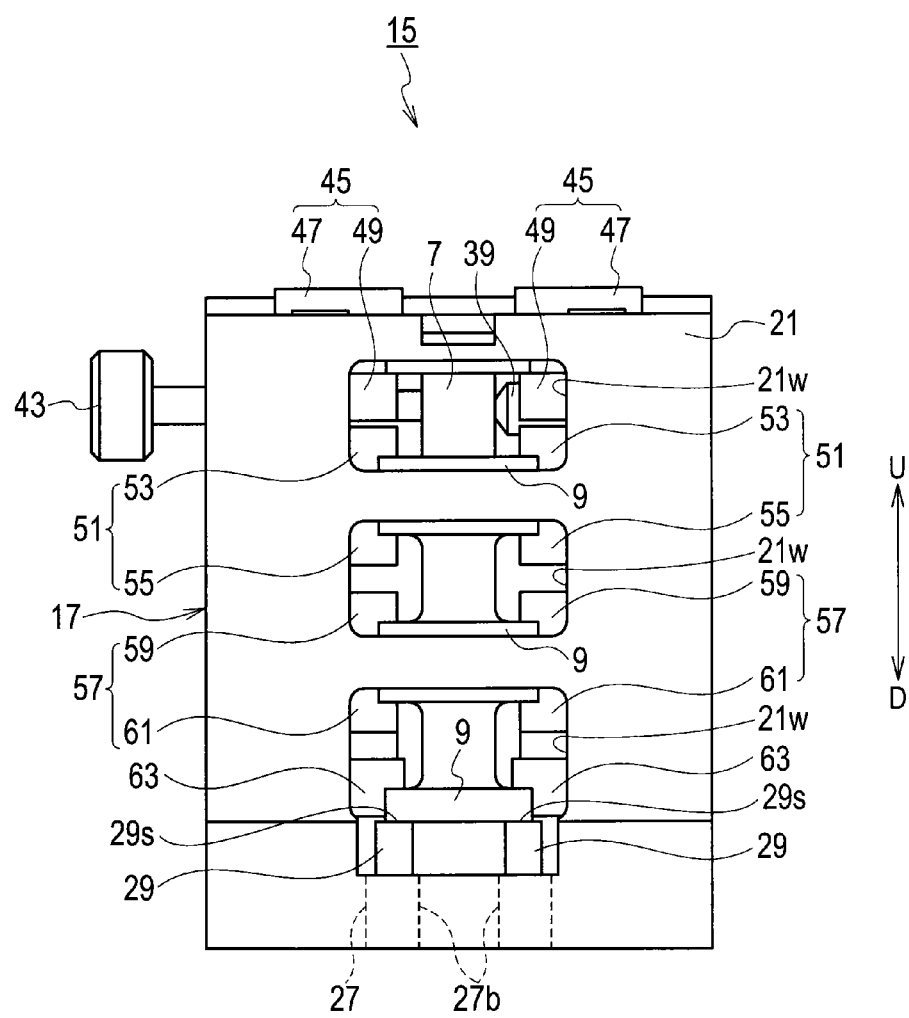
FIG. 5 is side view of the jig and the component, taken from an arrow V of FIG. 4.

Referring to FIG. 5, the back wall 21 is comprised of one or more openings 21w to allow access to the pin holes 9h of the tangs 9. Each opening 21w may be so dimensioned that the bush 13 can pass therethrough depending on the dimensions of the bush 13.

The main body 17, on the lower face thereof for example, may be comprised of legs for coupling with a machine tool. The legs may be used not only for coupling but also for precise positioning of the jig 15 relative to a machine tool or other jigs.

Figure 4:
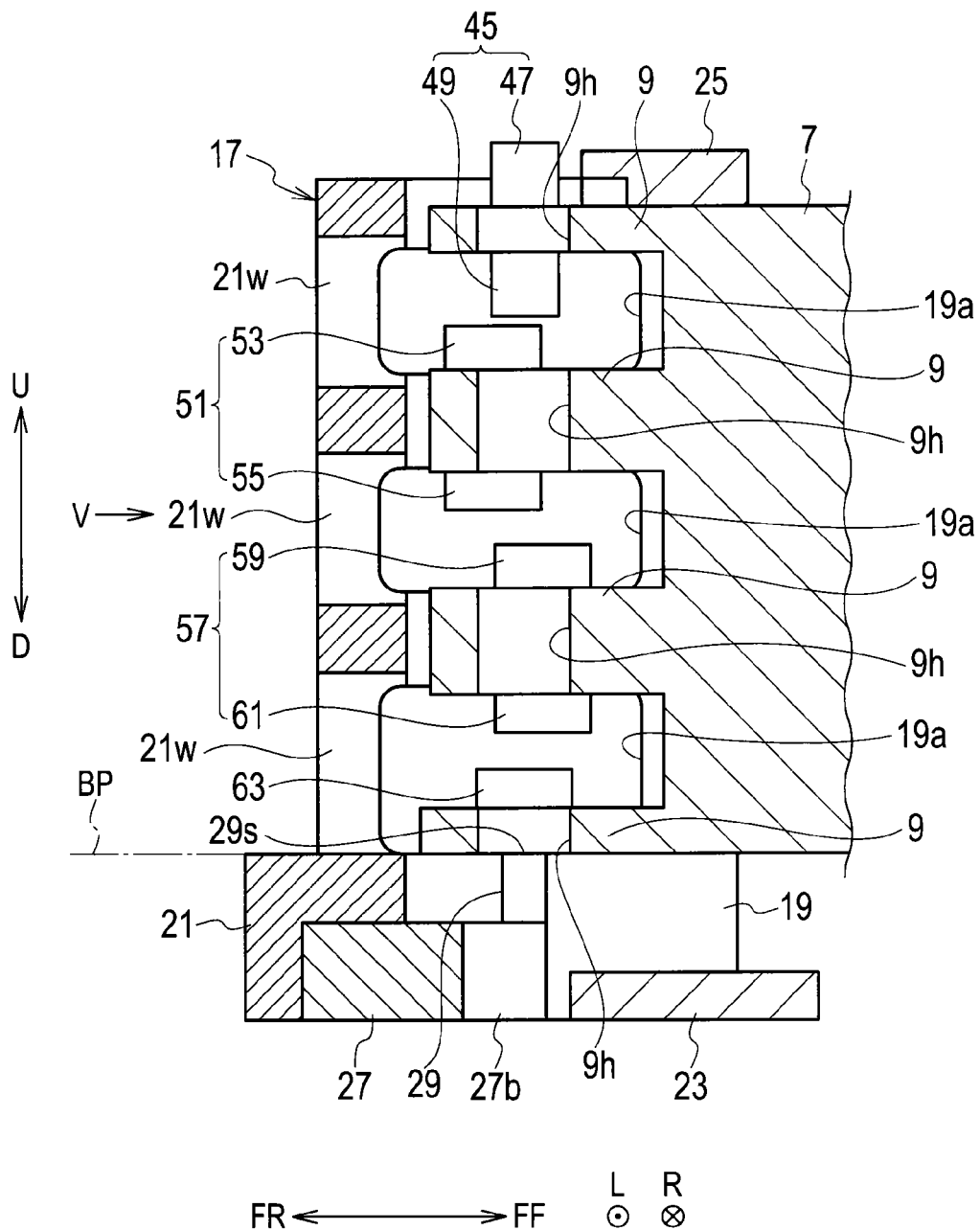
FIG. 4 is a cross sectional view of the jig and the component from which the positioning blocks are detached.

The jig 15 is further, as shown in FIGS. 2, 4 and 5, comprised of a support block 27 extending from the vicinity of the lowermost end of the back wall 21 to the forward direction FF. From the support block 27 extending to the forward direction FF is an arm 27b that is forked in a two-way so as not to prevent insertion of the positioning pin 37. The arm 27b is so structured as to support the lowermost tang 9, but a shim 29 may be interposed between the arm 27b and the tang 9. The block 27, along with the shim 29 if necessary, is secured to the main body 17 so as to accurately fall in place relative to the main body 17. The lower side of the lowermost tang 9 abuts on an upper face 29s of the support block 27, or the shim 29, and then the face 29s functions as a reference plane BP in the axial direction.

The positioning pins 33, 37 are so dimensioned as to precisely fit in the pin holes 9h of the tangs 9. The positioning pins 33, 37 may be directly attached to the main body or any positioning blocks 31, 35 may be interposed between the main body 17 and the positioning pins 33, 37. Further the positioning blocks 31, 35 may be separate bodies from the positioning pins 33, 37 but it is preferable that they are formed in unitary bodies in light of accuracy.

The positioning pins 33, 37 or the positioning blocks 31, 35 are detachably attached to the main body 17 and are so dimensioned that centers of the positioning pins 33, 37 are aligned with the reference line BL. Therefore, when the tangs 9 of the member 1 are inserted through the openings of the main body 17 and the positioning pins 33, 37 are inserted into the pin holes 9h, the axial center of the pin holes 9h comes to accurately align with the reference line BL.

Figure 10:
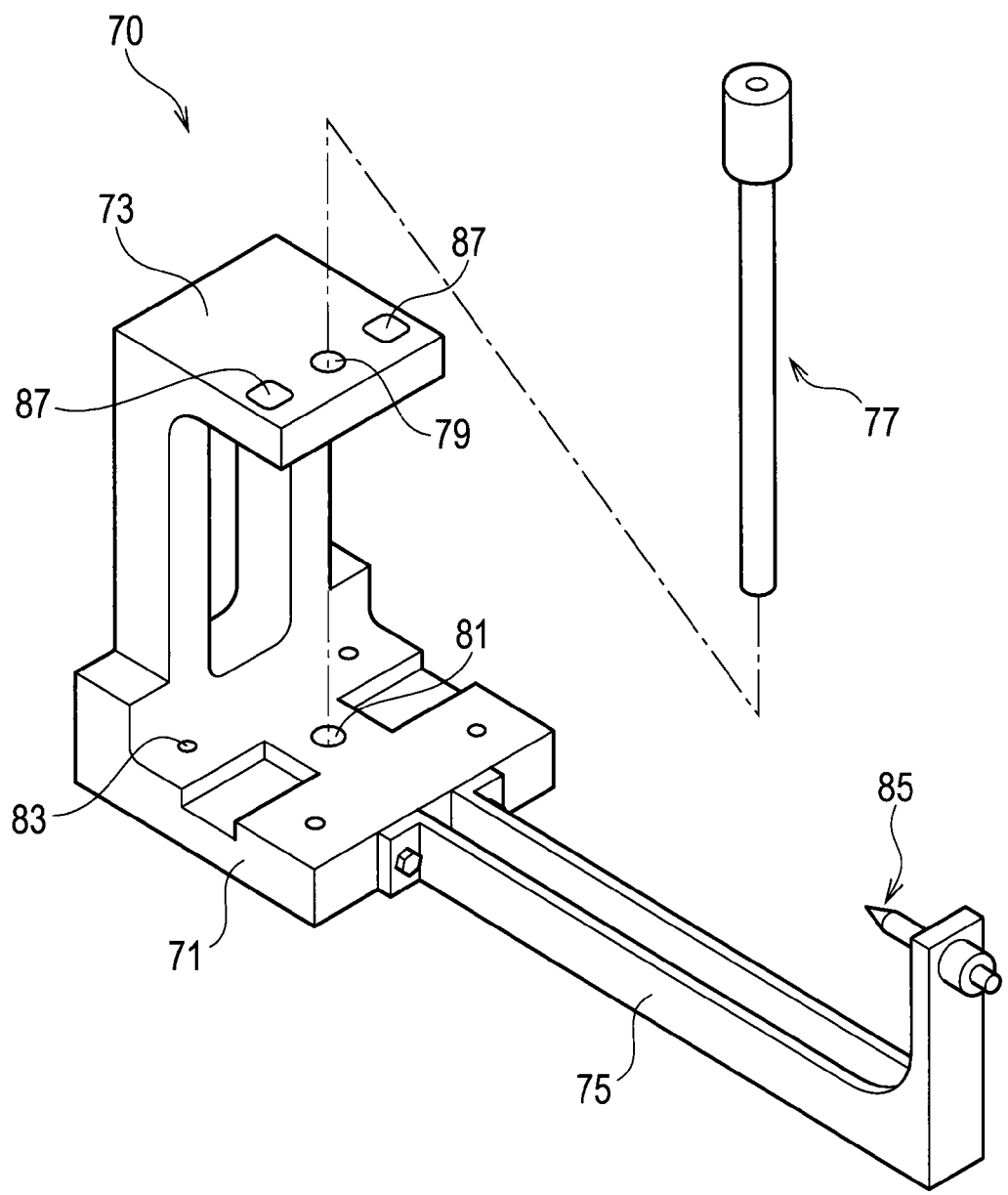
FIG. 10 is an exploded perspective view of a positioning block and a positioning pin according to another embodiment.

Alternatively, instead of the pair of positioning pins 33, 37, a single unitary elongated positioning pin 77 as shown in FIG. 10 may be used. Instead of the pair of positioning blocks 31, 35, a single unitary positioning block 70 may be used. The positioning block 70 is comprised of a pedestal 71 supporting the main body 17 from its lower side, and a top board 73 hanging over the main body 17, which respectively have guide holes 79, 81 for guiding the positioning pin 77. The positioning block 70 is preferably in light of accuracy formed in a unitary body but may be capable of being disassembled.

Figure 11:
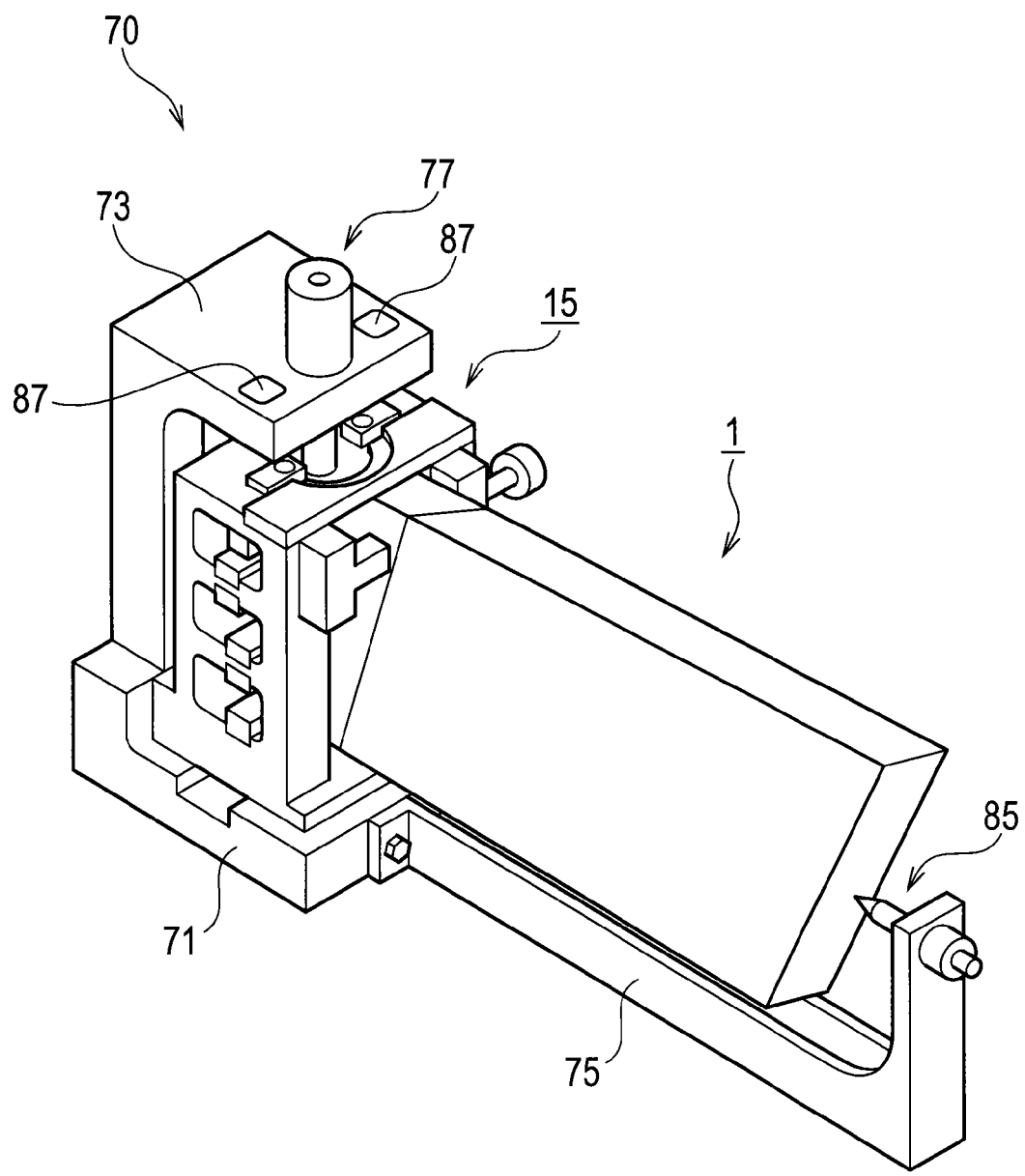
FIG. 11 is a perspective view of the jig, the component and the positioning block according to another embodiment.

The main body 17 and the positioning block 70 are so dimensioned that the centers of the guide holes 79, 81 are aligned with the reference line BL when the main body 17 and the positioning block 70 are mutually attached as shown in FIG. 11. Therefore, when the tangs 9 of the member 1 are inserted through the openings of the main body 17 and the positioning pin 77 is inserted in the pin holes 9h, the axial center of the pin holes 9h comes to accurately align with the reference line BL.

In the present embodiment, in order to improve accuracy of positioning of the main body 17 and the positioning block 70, the positioning block 70 may be comprised of any proper positioning means. In the example of FIG. 10 for instance, the block 70 is comprised of positioning holes 83 capable of coupling with legs of the main body 17. Either or both of the top board 73 and the pedestal 71 may be comprised of openings 87 for convenience of any tool's access to bolts.

Figure 8:
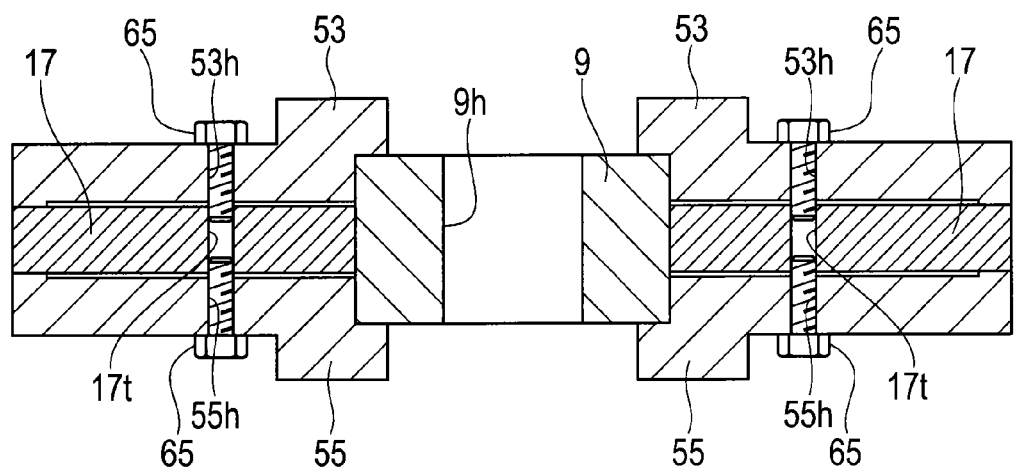
FIG. 8 is a cross sectional view of ribs and clamps of the jig and one of the tangs.

The clamps 45, 51, 57 pinch the tangs 9 along with the ribs elongated from the main body 17, thereby fixing the member 1 with the main body 17 in a state where the axial center is aligned with the reference line BL. It could be modified in a way, as shown in FIG. 8, that bolt holes 53h, 55h are provided respectively in an upper piece 53 and a lower piece 55 of each clamp 51 and accordingly tap holes 17t are provided in the main body 17. When bolts 65 are respectively inserted in the bolt holes 53h, 55h, the clamps 51 may be tightly pressed onto the tang 9.

Figure 9:
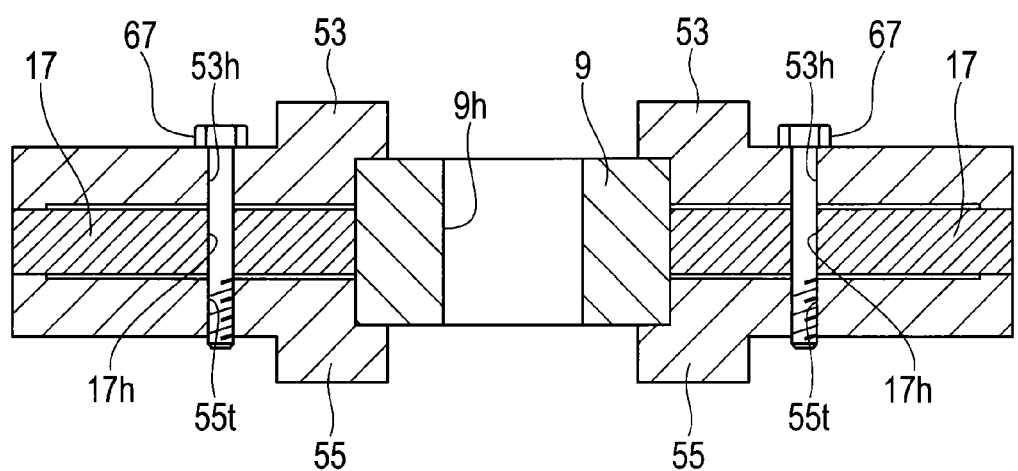
FIG. 9 is a cross sectional view of ribs and clamps of the jig and one of the tangs according to a modified embodiment.

Or, as shown in FIG. 9, through holes 17h may be provided in the main body 17 and accordingly tap holes 55t may be provided in the upper pieces 53 or the lower pieces 55. The other clamps 45, 57, namely the clamp 45 composed of the upper pieces 47 and the lower pieces 49, and the clamp 57 composed of the upper pieces 59 and the lower pieces 61, may be constructed in a similar manner.

For convenience of access to the aforementioned bolts, openings that respectively give clear views of these bolts may be provided on the upper side and the lower side of the main body 17. Further, for convenience of access from the upper side and the lower side, the clamps 45,51,57 may be disposed in a zigzag arrangement as being understood from FIG. 2 for instance. By this arrangement, access from the upper side of the main body 17 to the clamp 57 for example is not obstructed by the clamp 51. A torque screwdriver or such a tool that gains access from the upper side or the lower side is used to tighten or loosen bolts.

The jig 15 may be further comprised of an additional means for supporting the member 1. The example shown in FIG. 1 for instance illustrates a combination of a cantilever 39 fixed with one of the side walls 19 and a bracket 41 supporting a bolt 43, which is fixed with the other of the side walls 19. The bolt 43 and the cantilever 39 pinch the member 1, thereby supporting the member 1. The example shown in FIG. 10 in turn illustrates an arm 75 coupled with the positioning block 70 and elongated in the forward direction FF. A foremost end of the arm 75 is comprised of a supporting device such as a spindle 85 that supports an end in the forward direction FF of the member 1. One or both of the connection plates 23,25 may be made to abut on the member 1 in order to assist support of the member 1.

By means of the aforementioned jig 15, the member 1 comprised of the tangs 9 with the pin holes 9h receiving the coupling pins 11 is repaired in a way as described below.

Figure 3:
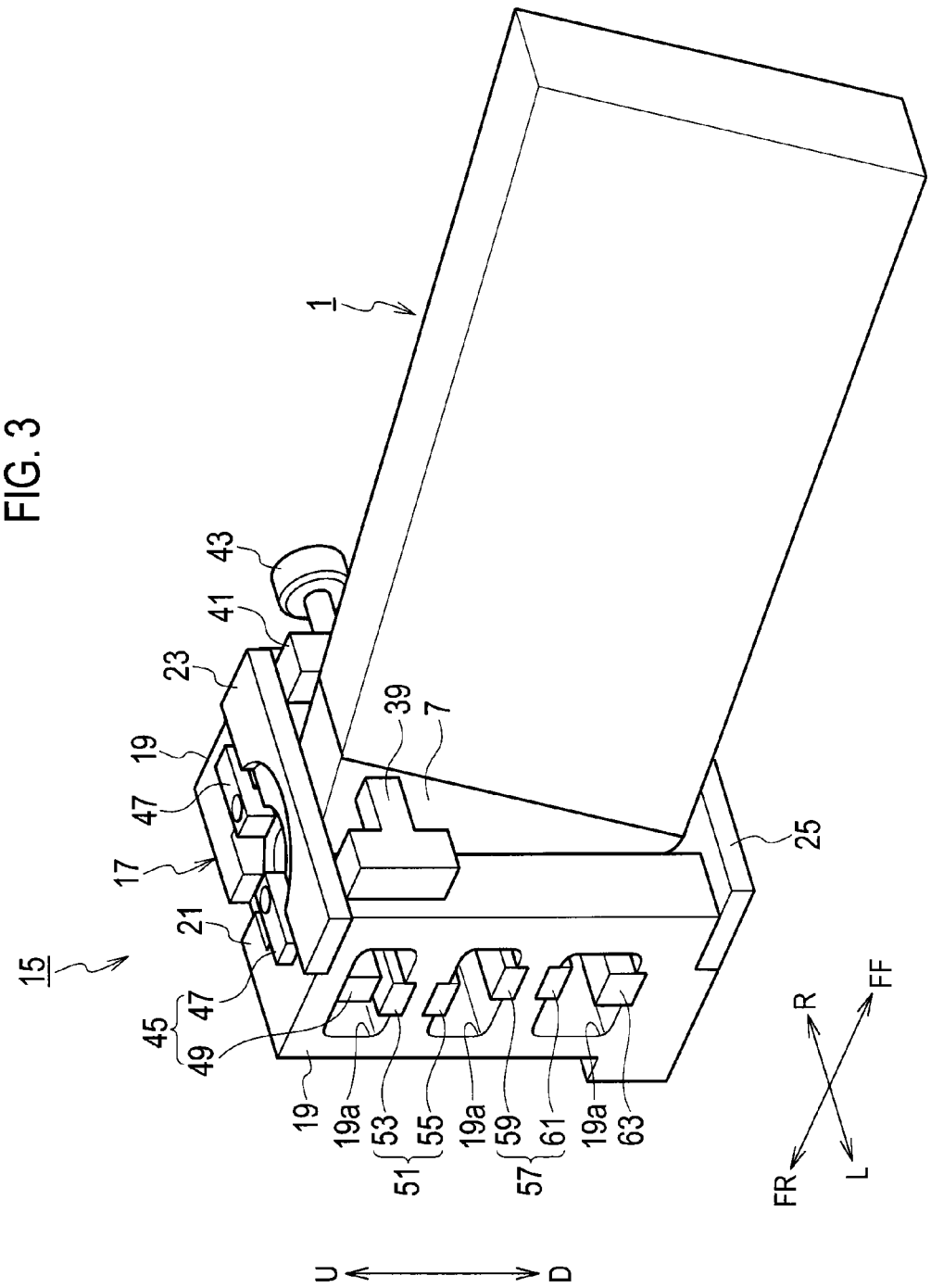
FIG. 3 is a perspective view of the jig and the component from which positioning blocks are detached.

Referring to FIG. 3, the positioning blocks 31,35, or the positioning block 70, are initially placed in a detached state. The tangs 9 of the member 1 are inserted through the opening in the forward direction FF of the main body 17.

Referring to FIG. 1 or FIG. 11, the positioning blocks 31,35, or the positioning block 70, are attached to the main body 17 and next the positioning pins 33,37, or the positioning pin 77, are attached to the main body 17 to fit in the pin holes 9h of the tangs 9, thereby positioning the member 1 so that the axial center of the pin holes 9h is aligned with the reference line BL of the main body 17. If the pin holes 9h had worn eccentrically as shown in FIG. 6A, as the other portions keep original shapes, the reference line BL of the main body 17 is made to accurately align with the axial center of the pin holes 9h.

Next the clamps 45,51,57 and the fitting 63 are tightened and thus the tangs 9 along with the ribs of the main body 17 are respectively pinched by them, thereby fixing the member 1 with the main body 17 in a state where the axial center thereof is aligned with the reference line BL.

After the member 1 is fixed with the main body 17, the positioning pins 33,37, or the positioning pin 77, are drawn out of the pin holes 9h, and the positioning blocks 31,35, or the positioning block 70, are also detached from the main body 17. Thereby the pin holes 9h are made accessible from the upper side or the lower side of the main body 17.

The member 1 is, as keeping fixed with the main body 17, served for a repair process. The main body 17 may be fixed with a milling cutter for example and may be, as shown in FIG. 6B, machined to enlarge diameters of the pin holes 9h by means of an end mill or such. Then, as the main body 17 is accurately positioned in place relative to the member 1, the main body 17 could offer sufficient accuracy even if used as a reference in machining instead of the pin holes 9h. To ensure accuracy in positioning, the legs below the main body 17 may be used for fixation with the milling cutter.

Next the member 1 is, as keeping fixed with the main body 17, served for a step of pressing bushes 13 into the tang 9 as shown in FIG. 6C for example. The openings 21w at the back wall 21 of the main body 17 can be used to place the bushes 13 into the pin holes 9h. Further, as the member 1 keeps fixed with the main body 17, the main body 17 is fixed with the milling cutter and, as shown in FIG. 6D, machined to make the diameters of the bushes 13 into desired diameters.

Then the pin holes 9h cannot be used as a reference plane. Further any of outlines of the tangs 9 cannot be used as a reference plane because the tangs 9 deform to a considerable degree as the bushes 13 is pressed therein. According to the present embodiment, however, instead of the pin holes 9h, the main body 17 that is stable in shape could be used as a reference. Therefore the bush holes 13h after being machined can be made to accurately match with the original pin holes 9h.

Rinsing for removing machining oil and inspection of the member 1 after repair can be carried out in a state where the member 1 is either detached from or fixed with the main body 17.

Although enlarging diameters and pressing bushes therein are exemplified, the jig 15 can be of course used in other processes. The jig 15 can be, instead of the member 1, used as a reference and, because the main body 17 has a shape convenient in handling, such as a rectangle, the present embodiment is prominently advantageous in light of accuracy and convenience of various processes.

Although the invention has been described above by reference to certain embodiments of the invention, the invention is not limited to the embodiments described above. Modifications and variations of the embodiments described above will occur to those skilled in the art, in light of the above teachings.

INDUSTRIAL APPLICABILITY

A jig and a method of repairing with excellent accuracy are provided.

What is claimed is:

1. A jig used for repairing a component having a tang with a hole, comprising:
    a main body defining a standard line;
    a positioning pin detachably attached to the main body and so dimensioned as to fit in the hole to make an axial center of the hole be aligned with the standard line;
    a positioning block detachably attached to the main body and so structured as to intervene between the main body and the positioning pin to make a center of the positioning pin be aligned with the standard line; and
    a clamp so structured as to catch hold of the tang to secure the component to the main body in a state where the axial center is aligned with the standard line.

2. The jig of claim 1, further comprising:
    a rib elongated from the main body and so dimensioned that the clamp catches hold of the rib along with the tang.

3. The jig of claim 1, wherein the main body comprises an opening allowing access in an axial direction relative to the standard line to the hole.

4. The jig of claim 1, wherein the main body comprises a window allowing access in a radial direction relative to the standard line to the hole.

5. A method of using a jig for repairing a component having a tang with a hole, comprising:
    detachably attaching a positioning block to a main body, the positioning block being so structured as to intervene between the main body and the positioning pin to make a center of the positioning pin be aligned with a standard line;
    detachably attaching a positioning pin to the main body and fitting the pin in the hole to make an axial center of the hole be aligned with the standard line of the main body; and catching hold of the tang with a clamp to secure the component to the main body in a state where the axial center is aligned with the standard line.

6. The method of claim 5, further comprising:

after the component is secure to the main body, leading the positioning pin out of the hole; and machining the hole.

7. The method of claim 6, further comprising:

after machining the hole, pressing a bush into the tang; and machining the bush.

* * * * *